US012495786B1

(12) United States Patent
Rogacki et al.

(10) Patent No.: US 12,495,786 B1
(45) Date of Patent: *Dec. 16, 2025

(54) FUMIGATION AND AERATION OF CONTAINERIZED CARGO

(71) Applicant: STG Logistics, Inc., Bensenville, IL (US)

(72) Inventors: Fred Rogacki, Fort Lauderdale, FL (US); James Teachman, Fort Lauderdale, FL (US)

(73) Assignee: STG Logistics, Inc., Bensenville, IL (US)

( * ) Notice: Subject to any disclaimer, the term of this patent is extended or adjusted under 35 U.S.C. 154(b) by 1207 days.

This patent is subject to a terminal disclaimer.

(21) Appl. No.: 16/705,477

(22) Filed: Dec. 6, 2019

Related U.S. Application Data (63) Continuation of application No. 15/418,961, filed on Jan. 30, 2017, now abandoned.

(51) Int. Cl.
*A01M 13/00* (2006.01)
*A01M 17/00* (2006.01)
*A23B 2/704* (2025.01)

(52) U.S. Cl.
CPC ........ *A01M 13/003* (2013.01); *A01M 17/008* (2013.01); *A23B 2/704* (2025.01)

(58) Field of Classification Search
CPC .......................... A01M 17/003; A01M 13/003
See application file for complete search history.

(56) References Cited

U.S. PATENT DOCUMENTS

| 5,641,463 | A  | * | 6/1997  | Langhart ............ A01M 13/003 |
|           |    |   |         | 422/294                          |
| 6,403,027 | B1 |   | 6/2002  | Napoles                          |
| 8,132,357 | B2 |   | 3/2012  | Rogacki                          |
| 8,424,240 | B2 |   | 4/2013  | Rogacki                          |
| 8,656,635 | B1 |   | 2/2014  | Rogacki                          |
| 9,497,955 | B1 |   | 11/2016 | Rogacki                          |

FOREIGN PATENT DOCUMENTS

| CN | 101316773 B    | * | 12/2011 | .......... A01M 13/003 |
| FR | 2643790 A1     | * | 3/1989  |                        |
| WO | WO-0203797 A1  | * | 1/2002  | .......... A01M 13/003 |

* cited by examiner

*Primary Examiner* — Magdalena Topolski
(74) *Attorney, Agent, or Firm* — Mark D. Bowen, Esq.; Malin Haley DiMaggio & Bowen, P.A.

(57) ABSTRACT

Tarpless fumigation and powered aeration of containerized cargo within a shipping container are disclosed. A portable fumigation containment door is installed in covering relation with main rear opening of a standard cargo container. The door is adapted with a fumigant diffuser for dispersing fumigant within the container. A recirculating fan disperses and circulates fumigant within the shipping container. Powered aeration is used to aerate the container through ports in the containment door by drawing fumigant laden air from the container while drawing in ambient air, while the container refrigeration unit is used to maintain a desired temperature.

3 Claims, 9 Drawing Sheets

FUMIGATION AND AERATION OF CONTAINERIZED CARGO

CROSS REFERENCE TO RELATED APPLICATIONS

This application is a continuation of U.S. patent application Ser. No. 15/418,961, filed on Jan. 30, 2017, now abandoned.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to systems and methods for fumigating containerized cargo without the use of tarpaulin, and more particularly to systems and methods for fumigation and aeration of perishable contents within a shipping container.

2. Description of Related Art

Containerization of cargo has revolutionized the shipping industry by increasing efficiency through the creation of standardized shipping containers that are designed for movement through all major modes of transportation, including cargo ships, trucks, and railroad cars. Due to such increases in efficiency, and improvement in refrigerated shipping container designs, a wide variety of perishable products, are now shipped throughout the world. With an increase in the availability and range of products, including perishable items, the risk of transporting harmful pests from one country to another along with the shipped goods also is enhanced. Invasive and/or non-native species often have the potential of endangering indigenous agriculture and wildlife, thereby causing widespread problems within existing agriculture systems. As a result, a large number of transported cargo, particularly produce and other perishable goods, must be fumigated upon arrival.

The standards of the method for fumigating cargo containers are established by the Plant Protection and Quarantine (PPQ) branch of the United States Department of Agriculture (USDA) and are detailed extensively. According to the current conventional method for the fumigation of containerized cargo, a tarpaulin is placed over the single container unit or multiple container units that are being fumigated. The cargo is arranged within the container in a manner such that the gas fumigant effectively circulates and penetrates the stored substances. A series of fans are introduced inside of the container, in order to disperse the fumigant. After the fans are placed, gas introduction lines are positioned behind the fans through the main rear doors of the container. At least three gas sampling tubes are placed in specific locations within the bulk containerized cargo and are used to actively monitor the concentration of the fumigant within the cargo during the fumigation process. The containers are typically large shipping containers; however, the tarpaulin method can be used with smaller containers.

Once the fans, sampling tubes, and introduction lines are positioned, one or more tarpaulins are simply draped over the cargo containers and sealed along the ground through either loose or wet sand, sand snakes, water snakes, weights, adhesives, or any other suitable sealing means. After the tarpaulin is sealed, the amount (typically by weight) of fumigant required is calculated based on the contained volume. Once the amount is determined, a gaseous fumigant, such as methyl bromide, is caused to flow through at least one introduction line into the contained volume and hence through the open doors of the tarpaulin covered shipping containers. The fumigant is allowed to flow into the tarpaulin confined space until calculated amount has been introduced. The fumigant concentration level is subsequently sampled, typically using three sampling tubes, to determine whether a predetermined concentration level has been achieved and maintained throughout the contained volume. If the concentration level is too low, then additional fumigant may be introduced. Conversely, if the concentration level is too high, then the fumigation time may be reduced. Upon completion of the fumigation phase, the volume is aerated through a method that is in accordance with treatment guidelines and/or the Fumigator's PPQ compliance requirements. The method of aeration typically involves placing fans and exhaust ducts underneath the tarpaulin so that the fumigant is evacuated into the atmosphere in a controlled manner. Once the container is sufficiently aerated, typically to less than 5.0 parts-per-million (5.0 ppm) for methyl bromide, the tarpaulin is removed, and the cargo is subsequently released.

There are many problems associated with using the tarpaulin method for fumigation containerized cargo. First, if performed outside of an enclosed environment, the tarpaulin method of fumigation can only be performed in certain weather conditions, specifically low wind situations. Also, the tarpaulin method is time consuming requiring the placement of a large tarpaulin. Furthermore, during placement and storage the tarpaulin can be damaged by the corners of the containers or other sharp objects, thereby leading to leaks. Finally, many problems have arisen related to the toxicity and ozone depletion characteristics of many used fumigants, especially methyl bromide. Tarpaulins are extremely difficult to completely seal off, leading to the inevitable release of fumigants during the fumigation process. Also the tarpaulin encases a much larger volume than just the container compartment, requiring the use of excess fumigant to adequately fumigate the contents of the cargo container. In turn this excess fumigant is still vented into the atmosphere during the aeration process, leading to greater environmental damage.

A further significant problem associated with venting the fumigant to the atmosphere through the aeration process involves exposing the contents of the container to elevated ambient temperatures for extended periods of time. Since the contents of the container are perishable, such as flowers, fruits, and vegetables, the containers are often equipped with packaged air conditioning systems that limit spoilage and extend shelf live by maintaining the interior of the container in a chilled or cold refrigerated state. Maintaining perishable cargo at proper refrigerated temperatures is referred to in the shipping industry as the "cold chain." Thus, requiring the container door(s) to be left open during the fumigant-venting aeration process causes the temperature within the container to rise thereby breaking the so-called "cold chain" resulting in increased product spoilage and reduced shelf life. Maintaining the cold chain is recognized industry-wide as being of critical importance. In order to prevent exposure of the contents to elevated temperatures, some fumigation service providers have been known to conduct the fumigation process within climate controlled buildings, which adds significant costs to the process.

As a result of the numerous disadvantages present with the conventional tarpaulin fumigation method, the background art reveals at least one attempt directed to fumigation of containerized cargo without the use of tarpaulin. U.S. Pat. No. 6,403,027, issued to Napoles et al on Jun. 11, 2002 describes such a method for fumigating cargo containers without the use of a tarpaulin. That method, commonly generally described as a "tarpless fumigation method," eliminates the need for a tarpaulin by using the cargo container as an enclosure for containing the fumigant during the fumigation process. The method includes placing fans and gas sampling tubes within the cargo container, and threading the electrical lines of the fans and the lines of the gas sampling tube out through a preexisting drain hole in the bottom of the cargo container. The gas introduction line is placed through another preexisting drain hole. The used drain holes are then sealed using a commercially available sealant, while the unused drain holes are plugged using any suitable means. Finally, after the main rear cargo doors are closed, the fumigant is flowed into the cargo container, and the contents of the cargo container are subsequently fumigated. While the method disclosed by Napoles reduces the amount of space that must be filled with fumigant, it is still prone to leaks. Specifically, it has been found that the main rear doors on a large number of shipping containers, particularly older containers, are damaged, not airtight, or otherwise incapable of maintaining an adequate seal thereby leading to the fumigant leakage from the container directly into the surrounding atmosphere.

The present inventors have contributed to advancements in the art of tarpless fumigation of containerized cargo by providing a containment door which is installed in covering relation with the main rear opening of a shipping container to form an airtight seal. The containment door is further adapted with connection ports for connection of fumigant injection and sampling lines through the door. This technology is disclosed in the following U.S. Patents, the disclosure of which is hereby incorporated herein by reference.

| U.S. Pat. No. | Title |
| --- | --- |
| 9,497,955 | Fumigation of Containerized Cargo |
| 8,656,635 | Fumigation of Containerized Cargo |
| 8,424,240 | Fumigation of Containerized Cargo |
| 8,132,357 | Fumigation of Containerized Cargo |

Still, a number of disadvantages remain present in the art of fumigating containerized cargo. One such disadvantage relates to the need to expose the cargo container interior, and more importantly the perishable cargo, to elevated environmental temperatures while venting of fumigant during the aeration process. Most venting is achieved by opening the rear container doors. As noted above, cold chain maintenance is critical for perishable products. Any break in the cold chain that exposes perishable product to elevated temperatures (even for a brief period) can accelerate product ripening thereby reducing shelf life and/or result in spoilage. Finally, the aeration process used when venting fumigant from the containers has proven slow, inefficient, and prone to exposing the contents to elevated temperatures.

There therefore exists a need for systems and methods for tarpless fumigation of containerized cargo that minimizes the amount of fumigant required, maximizes container cargo capacity, and maintains the cold chain for perishable products particularly during the aeration process.

BRIEF SUMMARY OF THE INVENTION

The present invention overcomes the limitations and disadvantages in the art by providing advancements in the art of tarpless fumigation of containerized cargo. In accordance with the present invention, a portable fumigation containment door is placed in covering relation with main rear opening of a standard cargo container and forms a generally airtight peripheral seal. The containment door is adapted with at least one connection port for receiving a fumigant injection line and which allows for the injection of fumigant into the container through the containment door. A fumigant diffuser, in fluid communication with the fumigant connection port, is disposed within the container and functions to disperse fumigant into the container. The containment door further includes fumigant sampling connection ports which are connected to fumigant sampling lines placed within the container to allow for fumigant concentration levels to be sampled. A significant aspect of the present invention, involves an option of using the evaporator/supply fan of the existing refrigeration unit associated with the shipping container to circulate and disperse the injected fumigant. Using the existing refrigeration unit supply fan eliminates the need for temporary installation and use of circulation fans places on top to the containerized product, which fans typically require at least 18" of clearance space. As a result, additional space is made available to accommodate additional cargo. In an alternate embodiment, a plurality of 8" axial fans may be used to further assist in dispersing and circulating the fumigant.

A further significant aspect of the present invention relates to improvements in aeration of the shipping container upon completion of the fumigation process. In accordance with this aspect, the containment door is adapted with at least one ambient air inlet and one container air outlet. A vacuum pump is connected to the container air outlet and, when powered on, draws fumigant laden air from the container while simultaneously drawing ambient air into the container via the ambient air inlet. In order to compensate for any increase in temperature resulting from the introduction of ambient air, the container's refrigeration system may be activated as necessary to maintain the perishable contents at a desired refrigerated temperature.

The method of fumigation of the present invention includes: (a) opening and securing at least one of the shipping container doors; (b) placing tubular gas sampling lines within the cargo container; (c) placing a containment door with integral fumigant diffuser covering relation with the cargo container rear opening to form a seal; (d) connecting a fumigant supply line to fumigant inlet port on the door; (e) connecting fumigant sampling lines to corresponding sampling line ports on the door; (f) sealing openings and outside air intakes on the shipping container using any suitable means; (h) injecting a suitable vaporized fumigant into the container via the fumigant supply line; (i) monitoring fumigant concentration; and (j) aerating the container by drawing container air from an aeration outlet using a suction pump while drawing in ambient air through an aeration inlet.

Accordingly, it is an object of the present invention to provide a system and method for fumigating containerized cargo without the use of a tarpaulin (e.g. a "tarpless" method).

It is another object of the present invention to provide a tarpless system and method for fumigating containerized cargo that minimizes the amount of fumigant required to perform the fumigation.

It is still another object of the present invention to provide a tarpless system and method for fumigating containerized cargo that minimizes the amount of fumigant required to perform the fumigation by limiting the amount of fumigant that is leaked during the fumigation process.

It is furthermore another object of the present invention to provide a tarpless system and method for fumigating containerized cargo that minimizes the amount of fumigant required to perform the fumigation by limiting the amount of fumigant that is leaked during the fumigation process by using a portable containment door to cover and seal the main rear opening of a cargo container.

It is still yet another object of the present invention to provide a tarpless method and system for fumigation containerized cargo that is quickly and easily operated and performed.

Yet another object of the present invention is to utilize the existing container refrigeration unit fan to disperse and circulate fumigant.

Still another object of the present invention is to use a suction pump to speed up the aeration process by drawing ambient air into the container and exhausting fumigant laden air.

Yet another object of the present invention is to maintain cold chain integrity throughout the fumigation process by using the refrigeration unit associated with the shipping container.

In accordance with these and other objects, which will become apparent hereinafter, the instant invention will now be described with particular reference to the accompanying drawings.

DETAILED DESCRIPTION OF THE INVENTION

Figure 1:
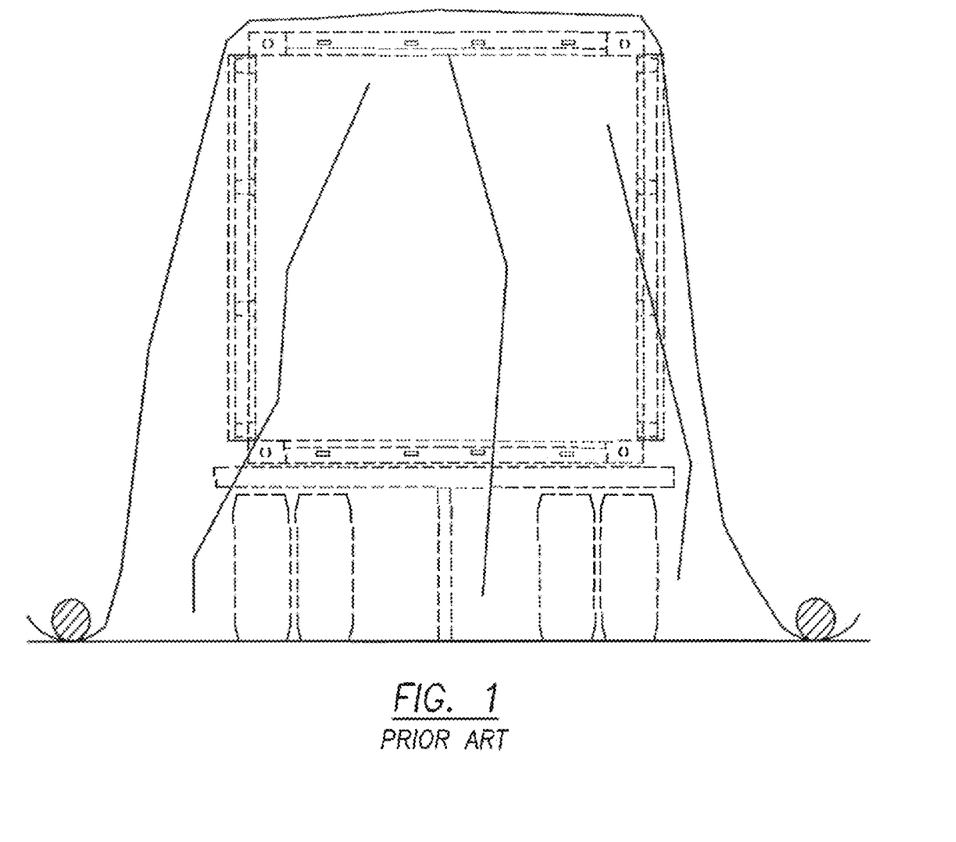
FIG. 1 depicts a trailer mounted shipping cargo container covered by tarpaulin for fumigation in accordance with a prior art method.

With reference now to the drawings, FIG. 1 illustrates a cargo container 100 covered by tarpaulin "T" secured with sandbags "S" in accordance with a prior art fumigation method. FIGS. 2-10 depict and illustrate fumigation of containerized cargo in accordance with the present invention. Systems and methods for fumigation of containerized cargo using a containment door are disclosed in U.S. Pat. No. 8,656,635, and related cases, the disclosures of which are hereby incorporated herein by reference.

Figure 2:
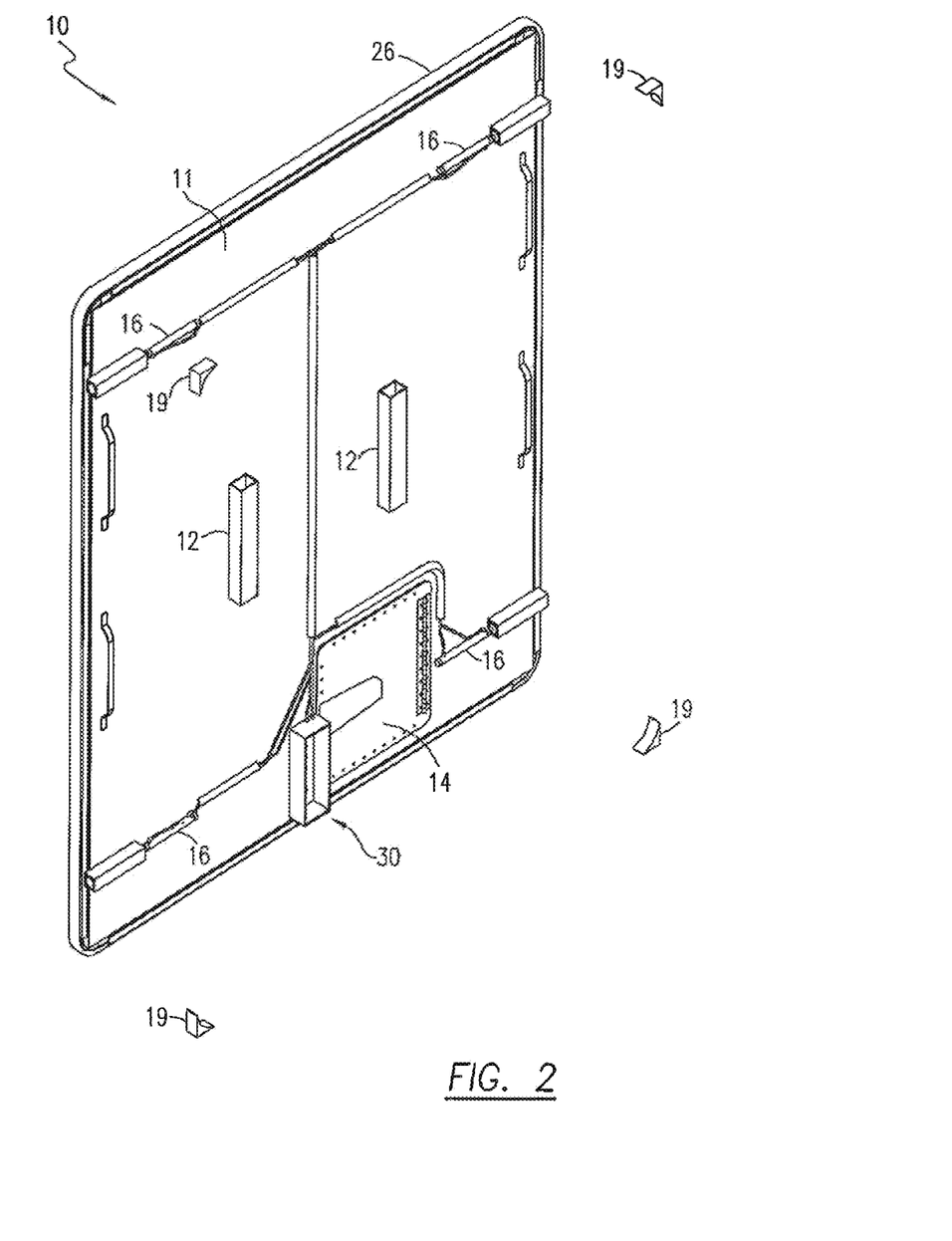
FIG. 2 is a top outer side perspective view of a fumigation containment door apparatus for use in accordance with present invention.
Figure 3:
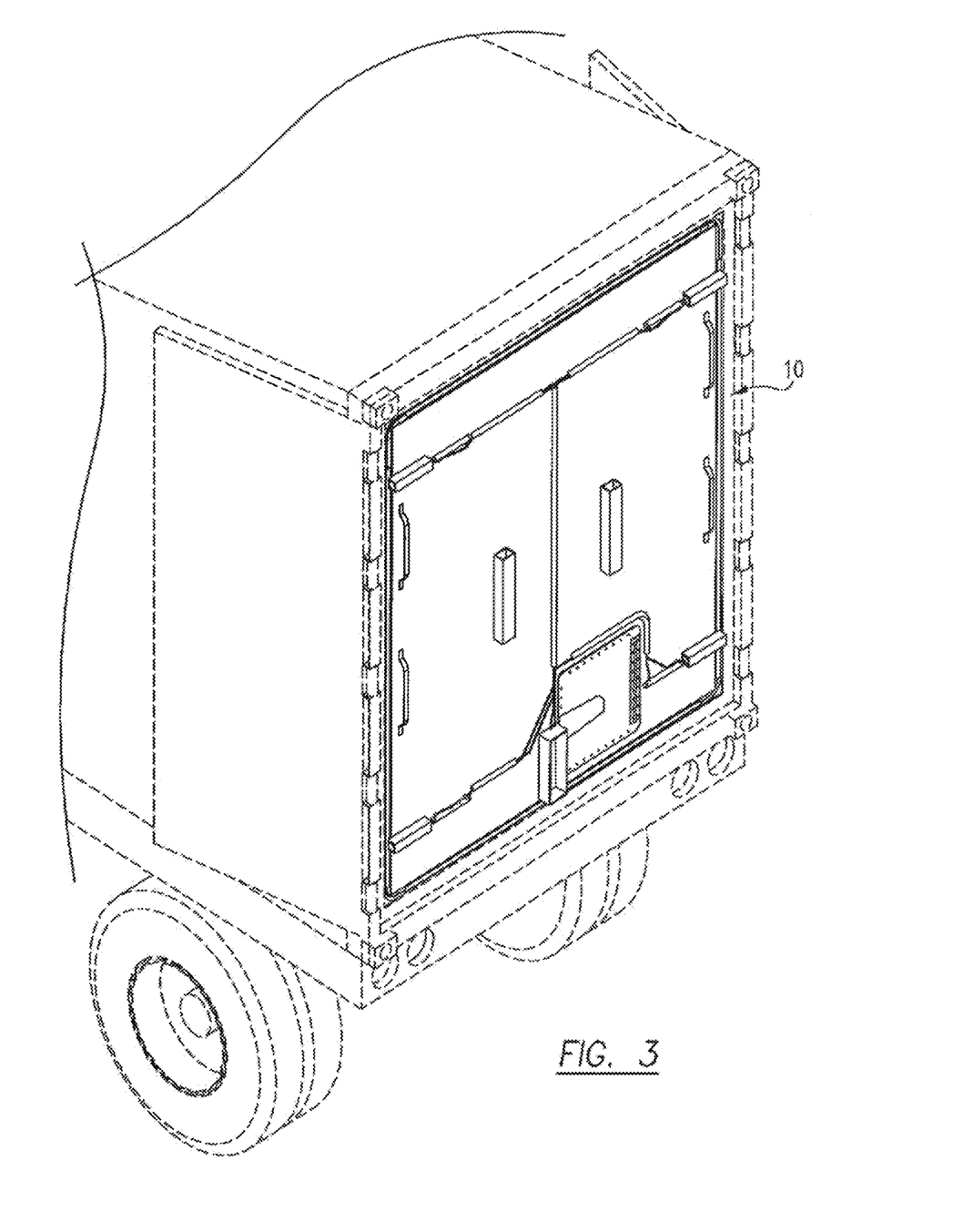
FIG. 3 is a top perspective view showing the fumigation containment door operatively installed in the open end of a shipping container.

As best seen in FIGS. 2 and 3, a portable fumigation containment door 10 is provided. Fumigation containment door 10 is sized to fit within the rear opening of a cargo container. In accordance with a preferred embodiment, door 10 is generally square or rectangular in shape and designed to fit within the standard 7'-8⅛" width and 7'-5¾" height of the main rear aperture opening of cargo containers with the standard lengths of 20', 40', 45', 48', or 53'. As should be apparent, the overall dimensions may be altered to fit any size or shape opening, and may be equally adapted for use with one container door remaining closed. Door 10 may be fabricated from metal, such as steel or aluminum, composite material, such as fiberglass or carbon composite, or any other suitable material. In a preferred embodiment, door 10 is fabricated primarily from aluminum.

Door 10 includes a main body 11 having channel members 12 affixed thereto. Each channel member 12 extends from the outer surface of main body 11 and functions as a lifting lug by receiving the prongs of a forklift (not shown). The forklift is preferably adapted by attachment of vertical members, sized for insertion into channel members 12, attached to the ends of the lifting forks. By operatively engaging the forklift, a quick and effective means is provided for lifting and positioning the containment door 10 into and out of the main rear opening of the cargo container. While the present invention discloses the channel member and forklift combination to lift and place door 10, the present invention contemplates any suitable alternate structure to maneuver the door. Fumigation containment door 10 further includes a sealable hatch 14 which provides access to the inner chamber of the cargo container through the portable containment door 10 when it is positioned to cover the rear opening of the cargo container. Hatch 14 is preferably connected to door 10 by hinge and latch structures and configurable between open and closed positions. The latching mechanism is used to securely close the hatch 14 and ensure that a seal is formed around the hatch 14. Pneumatic cylinders 16 are positioned in proximity to the outer edges of the containment door 10 and function to secure the door to a channel formed in the trailer body. A sealing gasket 26 extends completely around the peripheral edge of door 10 to form a seal.

As best seen in FIG. 2, door 10 has generally rounded or radiused corners. Accordingly, the present invention further provides corner seals 19. Each corner seal 19 preferably comprises a generally triangular sealing structure having straight legs disposed at 90 degrees and a concavely radiused hypotenuse. Corner seals 19 are preferably positioned to engage the corners of the cargo container with the radiused hypotenuse engaging one of the convex corners of door 10. Corner seals 19 may be adhesively secured to the corners of door 10.

A line connection housing 30 including a plurality of connection ports is disposed on door 10 adjacent to the hatch 14 on the outer surface of the portable containment door. The connection ports may include: a pneumatic connection port for actuating cylinders 16; sampling line connection ports to allow for connection of tubular sampling lines used to carry the sampled fumigant out from the interior of the cargo container during the fumigation process for sampling at a remote sampling station; a main fumigant introduction gas flow line connection port to allow for connection to a fumigant introduction line, through which fumigant is flowed into the cargo container; a compressed air connection that allows for connection of a compressed air line to selectively inflate gasket 26; and an electrical power connector 39 (optional for delivering power to temporary circulation fans).

Figure 4:
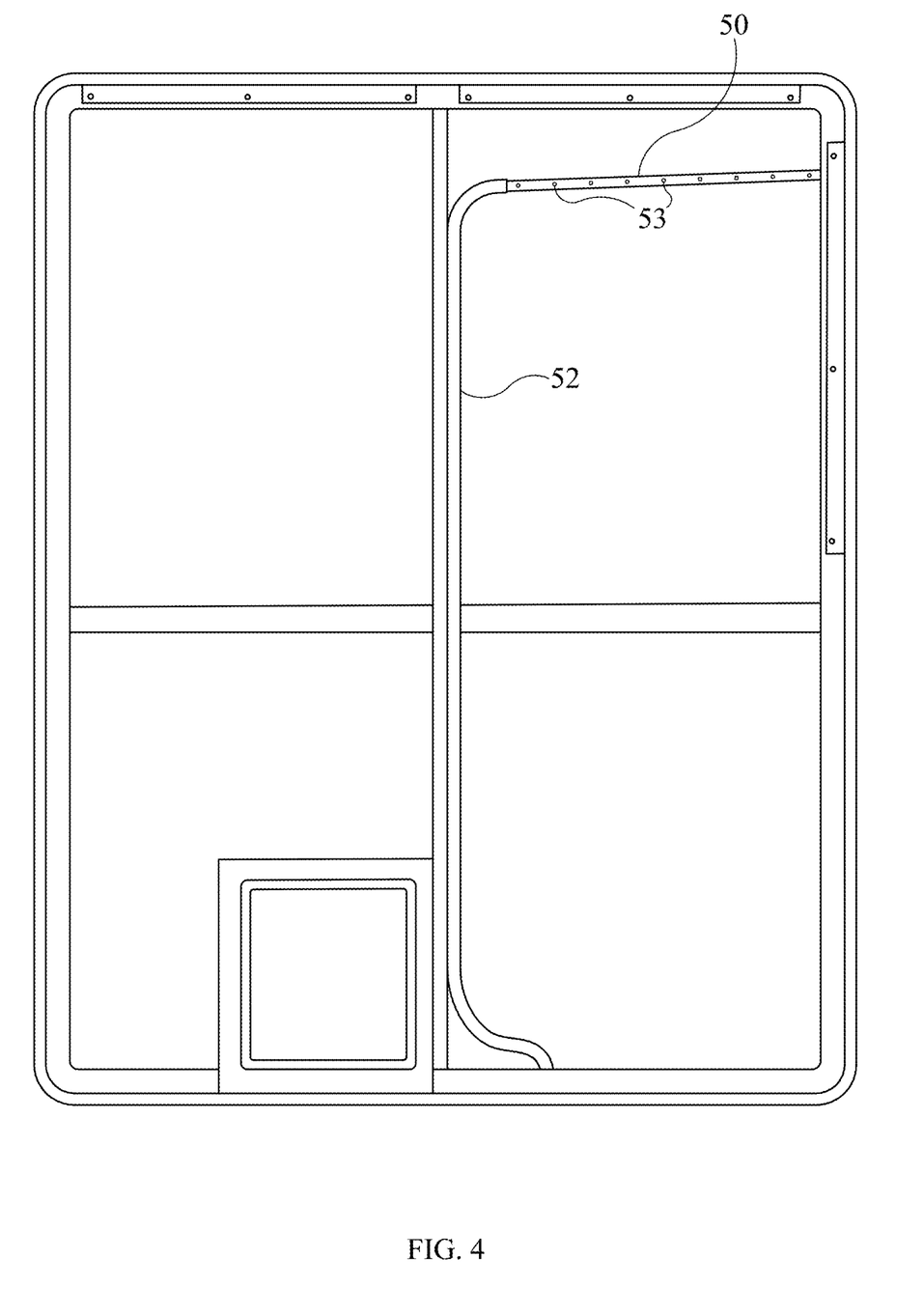
FIG. 4 is a rear view of the containment door adapted with a fumigant diffuser.
Figure 5:
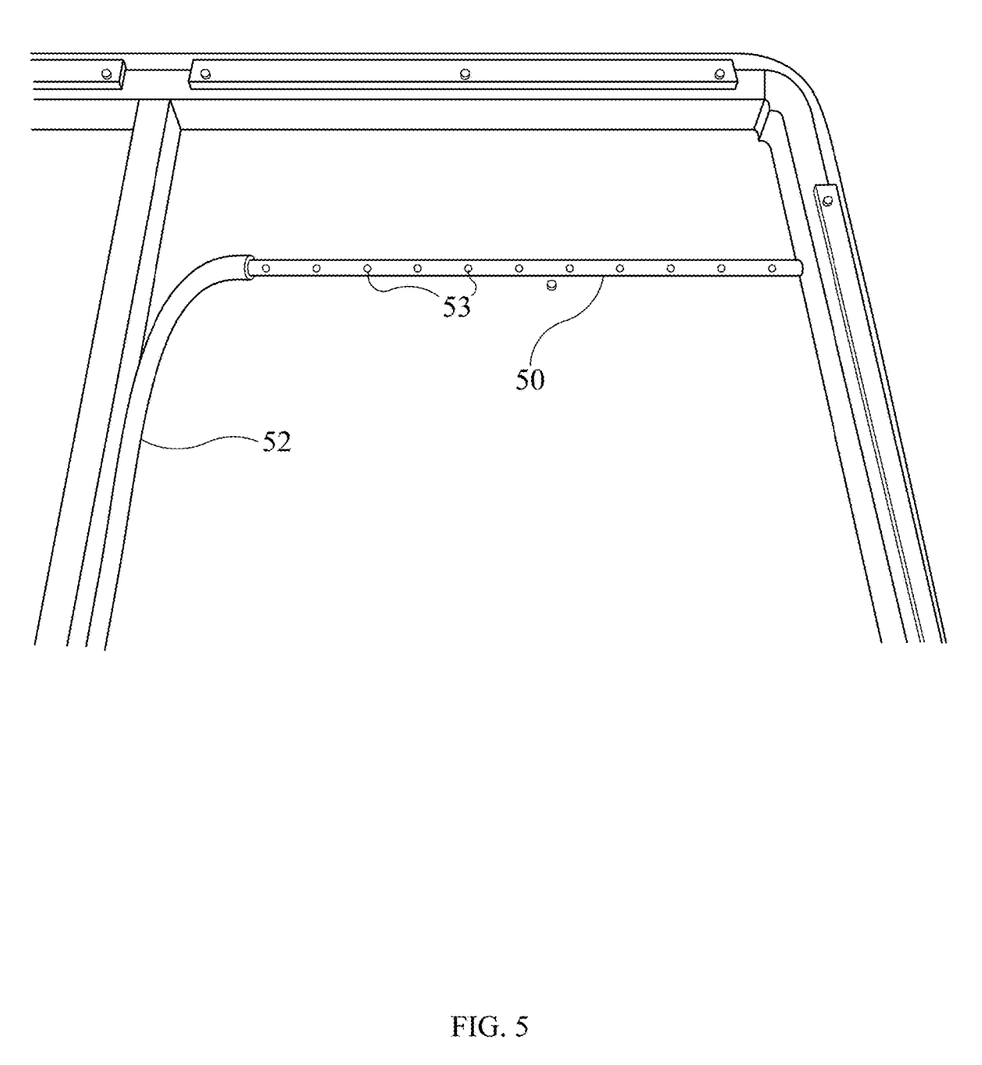
FIG. 5 is a partial detail view thereof.

A significant aspect of the present invention involves adapting containment door 10 with an integral fumigant diffuser 50 as seen in FIGS. 4 and 5. Fumigant diffuser 50 comprises a length of perforated copper tubing mounted near to top of door 10, and connected to a fumigant introduction line 52. In a preferred embodiment, diffuser 50 comprises a ½" in diameter, 36" in length piece of copper tubing having a plurality of holes 53 of ¹⁄₁₆" diameter formed therein, however, any suitable integrated diffuser arrangement is considered within the scope of the present invention. In addition, the present invention contemplates the possibility of using the evaporator fan on the refrigeration unit associated with the shipping container, in lieu of separately installed circulation fans, to circulate and disperse fumigant discharged into the container from diffuser 50. A typical refrigerated container includes a refrigeration unit comprising a vapor compression refrigeration system. The refrigeration units include a compressor, condenser coil, an evaporator coil, and an evaporator supply air fan. The evaporator fan typically circulates 3,200 cubic feet per minute ("CFM") of air across the evaporator coil and throughout the container in high speed mode, and 1,400 CFM in low speed mode. A significant aspect of the present invention, involves using the evaporator/supply fan of the existing refrigeration unit associated with the shipping container to circulate and disperse the injected fumigant. Using the existing refrigeration unit supply fan eliminates the need for temporary installation and use of circulation fans places on top to the containerized product, which fans typically require at least 18" of clearance space. As a result, additional space is made available to accommodate additional cargo. In addition, avoiding having to install temporary fans reduces the risk of pests escaping during the installation of said fans.

Figure 6:
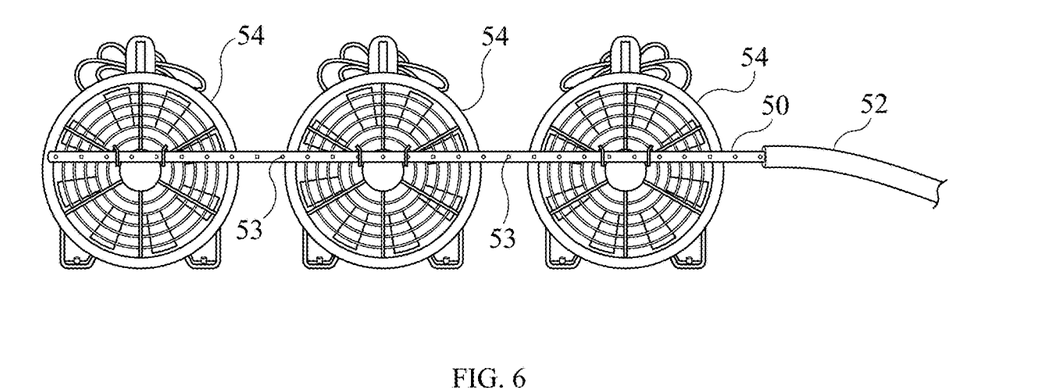
FIG. 6 is a depiction of an alternate embodiment fumigant diffusing system including a plurality of fans and a fumigant diffuser.

In an alternate embodiment illustrated in FIG. 6, the fumigant diffuser 50 is combined with a plurality of 8" axial fans 54 to further assist in dispersing and circulating the fumigant. In a preferred embodiment, a total of 3 axial fans are arranged along and attached directly to diffuser 50. Each fan is rated to move approximately 1,500 CFM of air, thereby providing a total of approximately 4,500 CFM when working in parallel. By using a plurality of smaller fans, this embodiment of the present invention allows for a reduction in the overhead free space requirement to be reduced from 18" to 12". By reducing the overhead space requirement by 6" approximately 150 cubic feet of additional cargo capacity is gained in a standard 40' shipping container.

The method of performing a fumigation within a cargo container comprises the steps of first visually inspecting the cargo container for damage to the outside that could cause fumigant to escape. If the cargo container is fit for performing the fumigation, the required components for performing the fumigation are positioned inside of the cargo container. In a preferred embodiment, the required components are gas sampling lines. The ends of the gas sampling lines are placed with sampling inlet ends spaced within the container per FDA regulations and the terminal ends placed near the back surface of the containment door so that they are still within the cargo container, but in close proximity to where the back surface line connectors are positioned. Next, the portable containment door is set in place using a forklift, and secured while forming a peripheral seal with the container. With the door locked in place and the seal formed, the user may then open hatch 14 on the front outer surface of the door allowing access to the inner sampling line ends. Then the user reaches in and connects the lines to the associated line connectors on the back inner surface of the portable containment door. The lines and corresponding connectors include the series of gas sampling lines, the fumigant introduction line, and the fan electrical lines. Once the appropriate lines for performing the fumigation are connected inside of the space within the cargo container to the back inner surface of the portable containment door, the hatch is closed. After the hatch is closed, the appropriate lines outside of the cargo container are connected to the corresponding line connectors in the line connector housing that is located on the front outer surface of the door. These lines include the pneumatic line, the main fumigant introduction line, the electrical line, and the gas sampling lines.

Once the door is successfully installed with the lines connected, the pressurized fumigant source is activated, causing the flow of a predetermined amount of fumigant through the main introduction line and into the space within the cargo container. In a first embodiment, the fumigant is discharged from integral fumigant diffuser 50, and dispersed and circulated by the container's existing refrigeration unit supply/evaporator fan. In an second embodiment, the fumigant is discharged from the alternate configuration of the fumigant diffuser 50 is combined with a plurality of 8" axial fans 52 as illustrated in FIG. 6.

Figure 7:
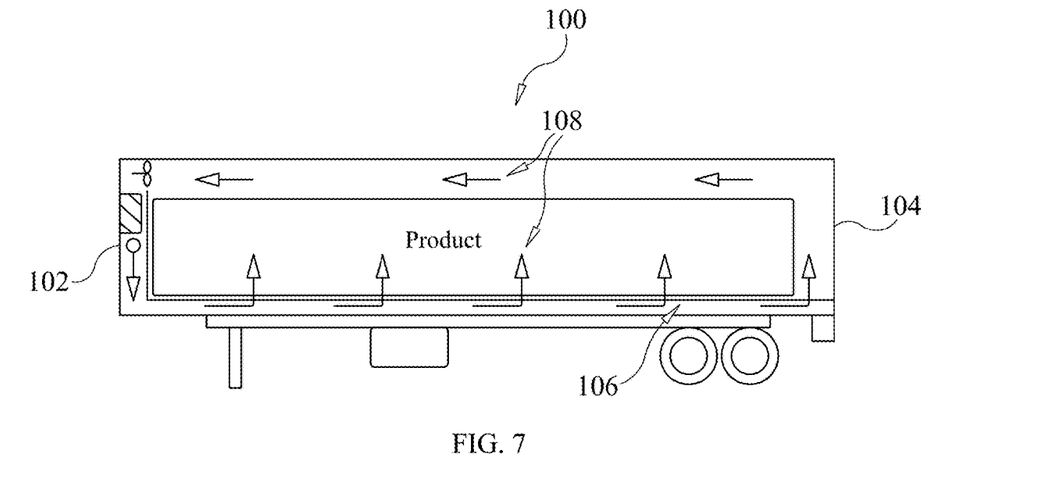
FIG. 7 is a side perspective view with partial cutaway of a refrigerated shipping container.
Figure 8A:
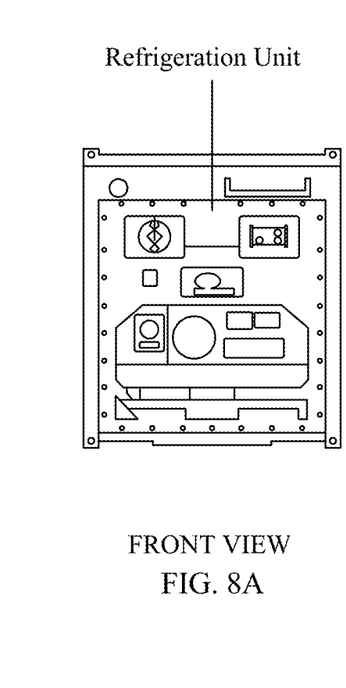
FIG. 8A is a front view of a refrigerated shipping container.
Figure 8B:
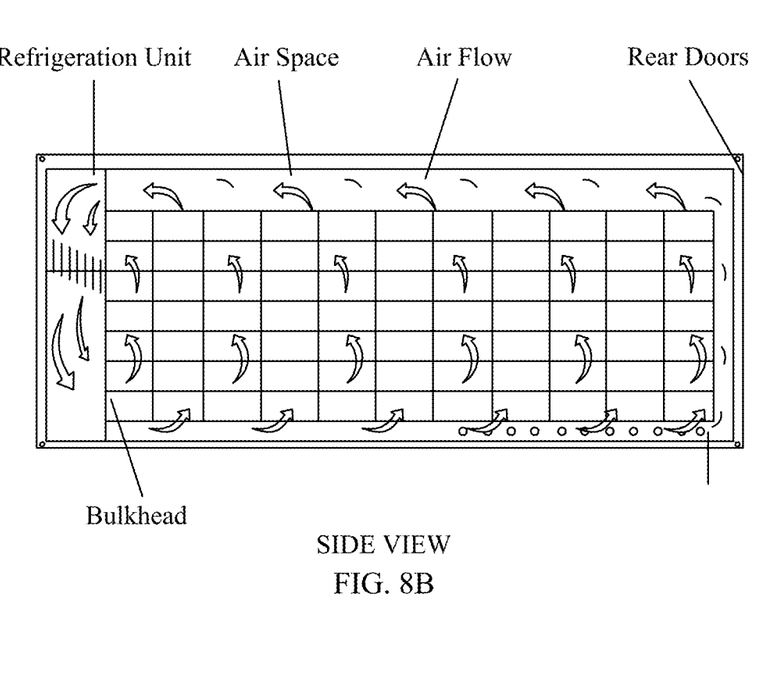
FIG. 8B is a side sectional view of a refrigerated shipping container illustrating air flow around the cargo.
Figure 8C:
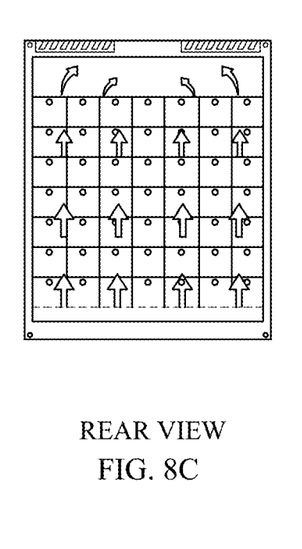
FIG. 8C is a rear sectional view thereof.

FIGS. 7, and 8A-8C illustrate circulation flow paths within a refrigerated shipping container 100 having an integral refrigeration unit 102 disposed at one end thereof, and rear doors 104 disposed at the opposing end thereof. Shipping container 100 further includes a floor defining channels 106 running the length of the container which allow for air circulation 108 below and around palletized cargo as best seen in FIGS. 7 and 8B and 8C.

Figure 9:
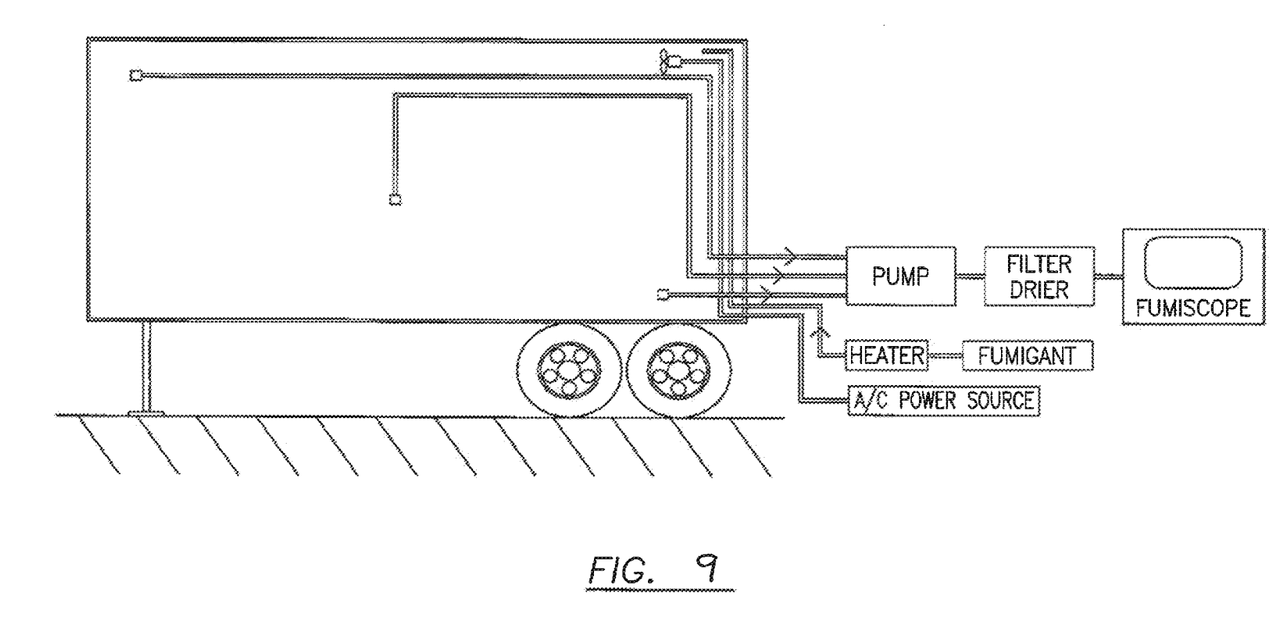
FIG. 9 is a schematic diagram of the fumigation system.

In accordance with the standard set forth by the PPQ compliance agreement, a USDA inspector obtains gas samples from within the cargo container via sampling lines connected to the sampling line connection ports as illustrated in FIG. 9. This sampled gas is flowed into a filter that includes Drierite®, a desiccant for removing water moisture, and Ascartie®, an absorbing substance used for removing carbon dioxide from the sampled gas. Once the sampled gas passes through the filter, it is then flowed into a fumiscope, where the concentration of fumigant from the sampled gas obtained at a specific point within the cargo container is determined. Fumigant concentration levels are typically sampled using three sampling tubes, to determine whether a predetermined concentration level has been achieved throughout the contained volume. If the concentration level is too low, then additional fumigant may be introduced. Conversely, if the concentration level is too high, then the fumigation time may be reduced. Upon completion of the fumigation process, which includes passage of a predetermined period of time, the containment door is removed and the aeration procedure is initiated.

Figure 10:
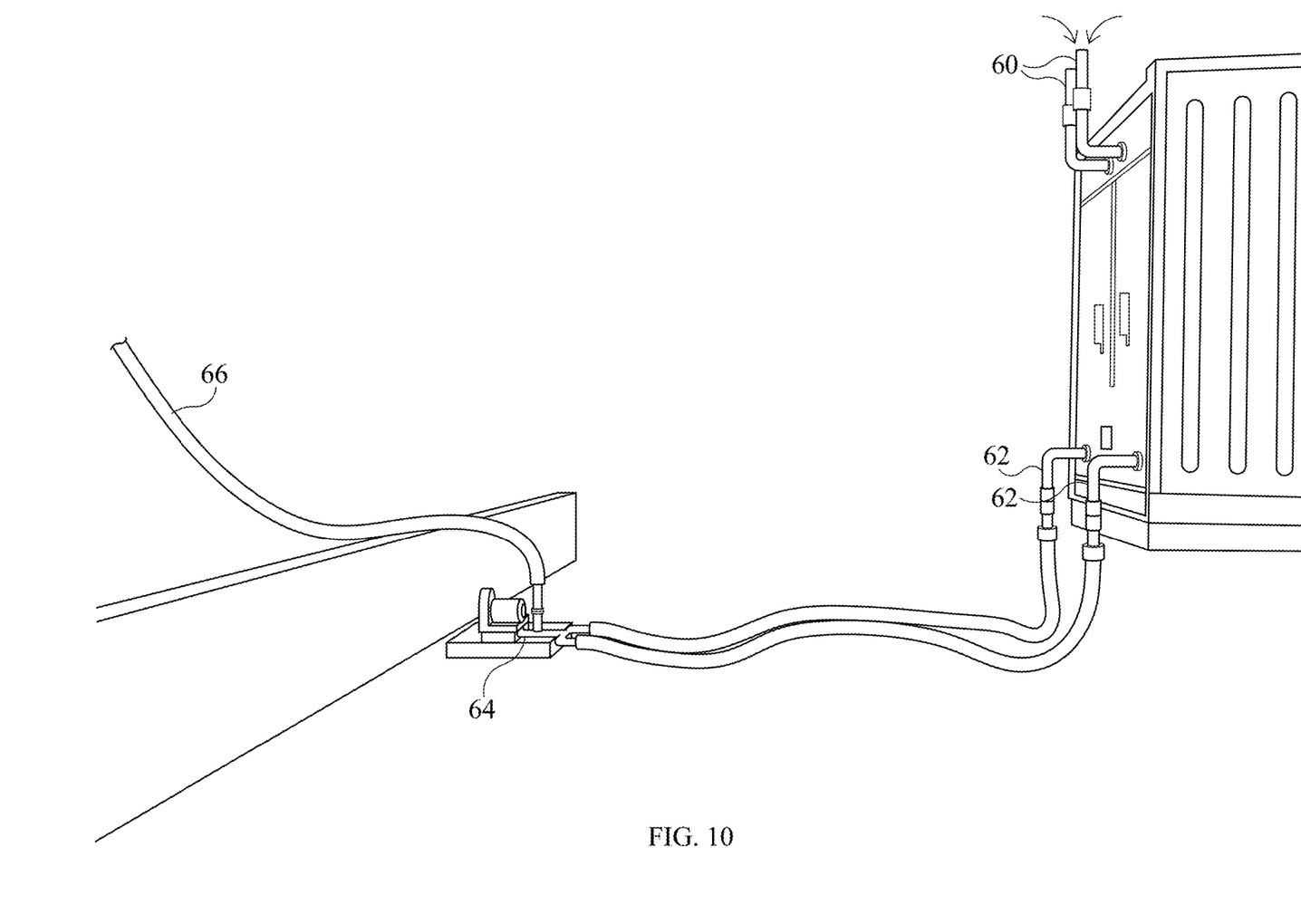
FIG. 10 depicts an alternate embodiment containment door adapted for pump assisted aeration.

A further significant aspect of the present invention relates to improvements in container aeration intended to maintain the cold chain. In accordance with this aspect, the containment door 20 is adapted with at least one ambient air inlet 60 and at least one container air outlet 62. A vacuum pump 64 is connected to the container air outlet 62 and, when powered on, draws fumigant laden air from the container through air outlet 62 while simultaneously drawing ambient air into the container via the ambient air inlet 60. Fumigant laden air is discharged from vacuum pump 64 to an exhaust duct 66 which may be routed to a suitable remote location, such as a roof mounted outlet, to discharge the fumigant laden air safely away from persons within the vicinity. In order to compensate for any increase in temperature resulting from the introduction of ambient air, the container's refrigeration system 102 may be activated as necessary to maintain the perishable contents at a desired refrigerated temperature.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of fumigating the contents of a standard refrigerated shipping container, having a main opening, while maintaining the shipping container interior in a refrigerated state, said method comprising the steps of:

(a) temporarily positioning a portable containment door in the standard refrigerated shipping container main opening, said portable containment door including an ambient air inlet and a container air outlet;
    (b) temporarily placing at least one auxiliary circulation fan within the standard refrigerated shipping container;
    (c) injecting fumigant into the shipping container through a fumigant diffuser;
    (d) activating said at least one circulation fan to disperse injected fumigant within the shipping container;
    (e) monitoring fumigant concentration within the shipping container;
    (f) maintaining a predetermined fumigant concentration for a predetermined time period by selectively injecting additional fumigant as needed; and
    (g) placing an external vacuum pump in fluid communication with said container air outlet, said vacuum pump causing fumigant laden air to be drawn from the shipping container interior and ambient air to be introduced into the shipping container via said ambient air inlet, said vacuum pump having an outlet discharging fumigant laden air directly into the atmosphere.

2. The method of fumigating the contents of a refrigerated shipping container according to claim 1, wherein said fumigant diffuser is connected to said containment door.

3. The method of fumigating the contents of a refrigerated shipping container according to claim 1, wherein said fumigant diffuser is connected to said at least one recirculating fan.

* * * * *